3,029,217
MOLDING COMPOSITION OF RUBBER REINFORCED STYRENE POLYMER AND LOW MOLECULAR WEIGHT HOMOPOLYMER OF AR-TERT.-BUTYLSTYRENE AND METHOD OF MAKING SAME
Carleton W. Roberts, Midland, Daniel H. Haigh, Beaverton, Richard H. Hall, Midland, and Junior J. Lamson, Bay City, Mich., assignors to The Dow Chemical Company, Midland, Mich., a corporation of Delaware
No Drawing. Filed Oct. 31, 1960, Ser. No. 65,961
6 Claims. (Cl. 260—45.5)

This invention concerns certain new compositions which are intimate mixtures of rubber reinforced styrene polymer blended with homopolymer of ar-tert.-butylstyrene of relatively lower molecular weight.

It is known to prepare molding compositions having improved flow rates during molding at elevated temperatures by blending or intimately incorporating normally solid thermoplastic alkenyl aromatic polymers of high molecular weight with normally solid thermoplastic alkenyl aromatic polymers of relatively lower molecular weight.

It has now been discovered that rubber reinforced styrene polymers such as the copolymers or graft copolymers prepared by dissolving from about 2 to 10 percent by weight of a rubbery copolymer of butadiene and styrene in a monomeric monovinyl aromatic hydrocarbon of the benzene series, e.g. styrene or vinyltoluene, and heating the mixture in mass or in bulk in the presence or absence of a peroxygen catalyst to polymerize the monomer, can readily be converted to resinous molding compositions possessing superior molding and physical properties by intimately incorporating with the rubber reinforced styrene polymer a small but effective amount within the range of from 2 to about 10 percent by weight of a homopolymer of ar-tert.-butylstyrene of relatively lower molecular weight within the range of from about 35,000 to 100,000.

The rubber reinforced styrene polymer starting material can be a copolymer of from 90 to 98 percent by weight of one or a mixture of one or more monovinyl aromatic hydrocarbons of the benzene series such as styrene, vinyltoluene, vinylxylene, ethylvinylbenzene, isopropylstyrene, p-tert.-butylstyrene and the like, and correspondingly of from 10 to 2 percent by weight of a rubbery copolymer of from 40 to 80 percent by weight of butadiene and from 60 to 20 percent of styrene which rubbery copolymer is soluble in monomeric styrene. Methods of making such rubber reinforced polymers are well known in the art and need not be described in detail. In brief, a rubber reinforced styrene copolymer is prepared by dissolving a synthetic rubber such as a copolymer of styrene and butadiene in monomeric styrene in amount corresponding to about five percent by weight of the solution then heating the solution in mass, i.e. in the absence or substantial absence of a diluent, to polymerize the monomer.

The homopolymer of ar-tert.-butylstyrene starting material can be prepared in usual ways such as by polymerizing the monomer in bulk at temperatures between 90° and 160° C. and in the presence of, or in contact with, a polymerization catalyst such as benzoyl peroxide, tert.-butyl hydroperoxide, ditert.-butyl peroxide, dicumyl peroxide, cumene hydroperoxide, lauroyl peroxide, tert.-butylperbenzoate or ditert.-butyl-diperphthalate, in amounts of from about 0.1 to 5 percent by weight of the monomer. The molecular weight of the polymeric ar-tert.-butyl styrene is controlled in part by the proportion of catalyst used and in part by the temperature at which the polymerization is carried out. Raising the temperature and increasing the proportion of catalyst both tend to produce a homopolymer of lower molecular weight. The molecular weight of the homopolymer is determined from the relationship of intrinsic viscosity for the copolymer as determined in toluene. Homopolymers having molecular weights of from about 35,000 to 100,000 corresponding to an intrinsic viscosity of from about 0.25 to 0.45 can be used.

The compositions are prepared by intimately incorporating the polymeric ingredients with one another in any usual way. The polymeric ingredients can be heat-plastified and mechanically worked or blended with one another on compounding rolls, a Banbury mixer or in a plastics extruder and at temperatures between 160° and 250° C., preferably in the absence or substantial absence of oxygen or air. In an alternative procedure the low molecular weight homopolymer of p-tert.-butyl styrene and the rubber can be dissolved in or intimately dispersed or suspended in the monomeric monovinyl aromatic hydrocarbon and the mixture heated to polymerize the monomer.

Small amounts of additives such as dyes, pigments, coloring agents, antioxidants, stabilizers, lubricants, mold release agents or plasticizers, can, if desired, be incorporated with the polymeric ingredients, but such additives are not required in the invention. The additives when used are usually employed in amounts corresponding to from 0.1 to 10 percent by weight of the final product.

The following examples illustrate ways in which the principle of the invention has been applied, but are not to be construed as limiting its scope.

EXAMPLE 1

In each of a series of experiments, a charge of a copolymer of 95 percent by weight of styrene and 5 percent of GR–S 1006 rubber (a copolymer of approximately 76.5 percent by weight of butadiene and 23.5 percent of styrene having a Mooney number of about 50) was compounded on a pair of heated laboratory rolls at a temperature of 180° C. with a charge of poly-ar-tert.-butylstyrene having a molecular weight of 57,000, in proportions as stated in the following table to form a homogeneous composition. The ingredients were compounded on the rolls for from 15 to 20 minutes after which the composition was removed from the rolls, was allowed to cool to room temperature and was cut to a granular form suitable for molding. Portions of the composition were injection molded at 350° F. (176.5° C.) and 12,000 pounds per square inch gauge pressure to form test pieces of ½ x ⅛ inch cross section by 4 inches long. These test pieces were used to determine the tensile strength and percent elongation for the composition employing procedures similar to those described in ASTM D638–49T. Impact strength was determined by procedure similar to that described in ASTM D256–47T. Heat distortion temperature was determined by procedure similar to that described in ASTM D648–45T. Table I identifies the experiments and gives the proportions of the copolymer of styrene and rubber and the homopolymer of ar-tert.-butylstyrene employed in making the same. For purpose of comparison, the copolymer of styrene and rubber starting material was compounded on the rolls and molded in the same manner and the properties determined for it are included in the table.

Table I

| Run No. | Starting Materials | | Product | | | |
|---|---|---|---|---|---|---|
| | Copolymer, 95% Styrene, 5% Rubber, Percent | Poly-t.-Butyl Styrene, Percent | Tensile Strength, lbs./sq. in. | Elongation, Percent | Notched Impact Strength, ft.-lbs. | Heat Distortion Temp., °C. |
| 1 | 100 | 0 | 4,910 | 34.6 | 1.44 | 84 |
| 2 | 95 | 5 | 5,130 | 39.5 | 1.22 | 85 |
| 3 | 94 | 6 | 5,020 | 39.0 | 1.20 | 86 |
| 4 | 93 | 7 | 4,970 | 53.2 | 1.10 | 86 |
| 5 | 92 | 8 | 5,030 | 43.6 | 0.91 | 86 |
| 6 | 91 | 9 | 4,880 | 42.9 | 0.86 | 86 |
| 7 | 90 | 10 | 4,910 | 40.2 | 0.80 | 85 |

EXAMPLE 2

In each of a series of experiments, a charge of a copolymer of 95 percent by weight styrene and 5 percent rubber similar to that employed in Example 1, was compounded on rolls at 180° C. with a homopolymer of ar-tert.-butylstyrene having a molecular weight and in amount as stated in the following table to produce a homogeneous composition. Molded test pieces of the composition were tested employing procedures similar to those employed in Example 1. Table II identifies the experiments and gives the properties determined for the compositions.

Table II

| Run No. | Starting Materials | | | Product | | | |
|---|---|---|---|---|---|---|---|
| | Copolymer, 95% Styrene, 5% Rubber Percent | Poly-tert.-butyl Styrene | | Tensile Strength, lbs./sq. in. | Elongation, Percent | Notched Impact Strength, ft.-lbs. | Heat distortion Temp., °C. |
| | | Mol. Wt. | Percent | | | | |
| 1 | 95 | 100,000 | 5 | 4,772 | 44.6 | 1.18 | 85 |
| 2 | 90 | 100,000 | 10 | 4,951 | 42.6 | 0.76 | 86 |
| 3 | 95 | 55,000 | 5 | 4,846 | 50.9 | 1.28 | 86 |
| 4 | 90 | 55,000 | 10 | 4,886 | 42.5 | 0.77 | 86 |
| 5 | 95 | 37,000 | 5 | 4,993 | 40.8 | 1.29 | 85 |
| 6 | 90 | 37,000 | 10 | 4,912 | 40.1 | 0.80 | 85 |

EXAMPLE 3

A solution consisting of 85.1 percent by weight of monomeric styrene 3.1 percent of white mineral oil, 4.7 percent of a rubbery copolymer of 76.5 percent by weight of butadiene and 23.5 percent of styrene, having a Mooney number of 50 and 7.1 percent of homopolymer of para-tert.-butyl-styrene having a molecular weight of 57,000, was placed in a sealed glass container and polymerized under time and temperature conditions as follows: 2 days at 95° C.; 6 days at 115° C.; and 2 days at 140° C. The product was cooled and was recovered by breaking the glass container. The product was a solid block of thermoplastic material. It was milled for 20 minutes on a pair of 3 inch diameter by 8 inches long laboratory rolls at a temperature of 180° C., then was sheeted out and removed from the rolls and was allowed to cool to room temperature after which it was ground to a granular form. Portions of the granular product were injection molded to form test pieces and were tested employing procedures similar to those employed in Example 1. The product had the properties:

Tensile strength, lbs./sq. in _____ 5450
Elongation, percent _____ 43.6
Notched impact strength, ft.-lbs. _____ 0.5
Heat distortion temperature, °C _____ 76.5

We claim:
1. A resinous composition consisting of (1) from 90 to 95 percent by weight of a normally solid thermoplastic copolymer of from 90 to 98 percent by weight of a monovinyl aromatic hydrocarbon of the benzene series and from 10 to 2 percent by weight of a rubbery copolymer of from 40 to 80 percent by weight of butadiene and from 60 to 20 percent of styrene, intimately incorporated with (2) from 10 to 5 percent by weight of homopolymer of ar-tert.-butylstyrene having a molecular weight between about 35,000 and 100,000.

2. A composition consisting of (1) from 90 to 95 percent by weight of a normally solid thermoplastic copolymer of approximately 95 percent by weight of styrene and about 5 percent of a rubbery copolymer of approximately 75 percent by weight of butadiene and about 25 percent of styrene, intimately incorporated with (2) from 10 to 5 percent by weight of a homopolymer of ar-tert.-butyl styrene having a molecular weight between about 35,000 and 100,000.

3. A composition according to claim 2, wherein the homopolymer of ar-tert.-butylstyrene has a molecular weight of about 57,000.

4. A composition according to claim 2, wherein the homopolymer of ar-tert.-butylstyrene has a molecular weight of about 100,000.

5. A composition according to claim 2, wherein the homopolymer of ar-tert.-butylstyrene has a molecular weight of about 37,000.

6. A method for making a resinous composition of matter which comprises intimately incorporating (1) from 90 to 95 percent by weight of a normally solid thermoplastic copolymer of from 90 to 98 percent by weight of a monovinyl aromatic hydrocarbon of the benzene series and from 10 to 2 percent by weight of a rubbery copolymer of from 40 to 80 percent by weight of butadiene and from 60 to 20 percent of styrene, with (2) from 10 to 5 percent by weight of a homopolymer of ar-tert.-butylstyrene having a molecular weight between about 35,000 and 100,000 by intimately blending the polymeric ingredients with one another at temperatures between 160° and 250° C. to form a homogeneous composition.

No references cited.